United States Patent [19]

Minegishi et al.

[11] Patent Number: 5,600,442
[45] Date of Patent: Feb. 4, 1997

[54] POSITION DETECTING APPARATUS BASED ON BEFORE AND AFTER MODE-HOP SIGNALS

[75] Inventors: Isao Minegishi; Hiroyuki Kawashima; Susumu Saito, all of Tokyo, Japan

[73] Assignee: Kabushiki Kaisha TOPCON, Japan

[21] Appl. No.: 365,240

[22] Filed: Dec. 28, 1994

[30] Foreign Application Priority Data

Dec. 29, 1993 [JP] Japan .................................. 5-355224

[51] Int. Cl.$^6$ .................................................. G01B 9/02
[52] U.S. Cl. .............................. 356/358; 356/349; 372/19
[58] Field of Search ............................ 356/345, 349, 356/356, 358; 372/19, 20, 29, 32

[56] References Cited

U.S. PATENT DOCUMENTS

| | | | |
|---|---|---|---|
| 5,106,191 | 4/1992 | Ohtsuka | 356/358 |
| 5,185,643 | 2/1993 | Vry et al. | 356/358 |
| 5,198,873 | 3/1993 | Ishizuka et al. | 356/356 |
| 5,353,115 | 10/1994 | McIntyre | 356/358 |
| 5,453,833 | 9/1995 | Kawashima et al. | 356/349 |

*Primary Examiner*—Frank Gonzalez
*Assistant Examiner*—Robert Kim
*Attorney, Agent, or Firm*—Ronald P. Kananen

[57] ABSTRACT

A position detecting apparatus comprises a light emitter which activates a laser source to emit a light beam so that mode hopping occurs, an interference optical system which directs the light beam from the laser source to a measuring light path on which an object to be measured is located and a reference light path on which a reflection mirror is placed and merges the reflected light beams coming back on the light paths so that the reflected light beams interfere with each other, a light sensor which receives the interference light beam provided by the interference optical system, and a position detector which determines the position of the object of measurement based on the interference signals produced by the light sensor before and after mode hopping caused by the light emitter.

7 Claims, 7 Drawing Sheets

POSITION DETECTING APPARATUS BASED ON BEFORE AND AFTER MODE-HOP SIGNALS

BACKGROUND OF THE INVENTION

The present invention relates to a position detecting apparatus of the absolute type, and particularly to a position detecting apparatus such as an optical probe for a 3-dimensional measuring instrument.

A variety of apparatus for the absolute distance measurement by using the light of two sufficiently separate wavelengths have been proposed, such as that disclosed in Japanese Patent Application No. 5-19216 filed by the applicant of the present invention, and any of these apparatus is based on the provision of a plurality of laser sources of different wavelengths for producing the light of two sufficiently separate wavelengths.

However, it has been very difficult for the use of a plurality of laser sources to stabilize each laser source independently. This has necessitated alignment control for the laser sources, making accurate control more difficult.

SUMMARY OF THE INVENTION

An object of the present invention is to provide a position detecting apparatus which uses a single light source to eliminate the need of alignment control and is capable of performing the absolute position detection stably and which accurately.

The present invention resides in a position detecting apparatus which comprises a light emitter which activates a laser source to emit a light beam so that mode hopping occurs. An interference optical system which directs a light beam from a laser source to a measuring light path on which an object to be measured is located; and a reference light path on which a reflection mirror is placed and merges the reflected light beams coming back on these light paths so that the reflected light beams interfere with each other, a light sensor which receives the interference light beam provided by the interference optical system, and a position detector which determines the position of the object of measurement based on the interference signals produced by the light sensor before and after mode hopping caused by the light emitter.

The inventive position detecting apparatus can be practiced in the form of a fringe-type sampling scheme (first embodiment described later) as well as a non-fringe-type continuous data sampling scheme (second embodiment described later).

In the first embodiment (sampling scheme), the light emitter operates to light up in the form of pulse modulation. The laser source is activated to light up pulsatively, with an associated Peltier element being under a temperature stabilizing control so that mode hopping occurs. It is not absolutely necessary for the variation of the laser wavelength to be linear with respect to time.

In the interference optical system, a measuring interference optical system uses the interference caused by a measurement surface and a movable mirror; and a reference interference optical system uses the interference caused by a fixed mirror and the movable mirror.

In regard to a light path length varier, fringe scanning has a variation greater than the value of wavelength of the light beam of the laser source around mode hopping. The peak and bottom levels of the interference signal can be detected, and the phase of the interference signal at the object position can be determined.

The light emitter has its pulsative lighting frequency $f_p$ set higher than the variation frequency $f_L$ of the light path length varier.

The second embodiment (the continuous data sampling scheme) is based on the premise that the wavelength variation before and after mode hopping is linear with respect to time.

The light emitter operates in the form of continuous lighting. The wavelength varying means operates to vary the laser wavelength as follows. The laser source is of continuous lighting. The Peltier element is controlled to vary the temperature of the laser source so that mode hopping occurs.

In order to make the wavelength variation before and after mode hopping linear with respect to time, the temperature variation is kept constant provided that the temperature variation and wavelength variation have a linear relationship. In the case of a nonlinear relationship, the temperature is controlled in a nonlinear manner so that the wavelength variation is linear.

According to the present invention set forth in Claims 1 through 7, it is possible to perform the absolute distance measurement by using a single light source based on the interference signal of light beams of two wavelengths before and after mode hopping derived from the same light source.

Using light beams before and after mode hopping enables the use of an interference signal created by light beams of separate wavelengths, and a high-accuracy measurement is made possible.

Particularly, according to the inventive apparatus based on the sampling scheme (first embodiment) set forth in Claims 2, 3 and 6, it is possible even for the use of a laser element, which does not have a linear wavelength variation, to perform the measurement by use of a signal with a certain wavelength. This ensures the higher accuracy.

Particularly, according to the inventive apparatus based on the non-fringe continuous data sampling scheme (second embodiment) set forth in Claims 4, 6 and 7, it is possible to eliminate the fringe scanning and thus perform a short-time measurement, and the intended measurement can be performed with a simple overall arrangement.

DESCRIPTION OF THE PREFERRED EMBODIMENTS

The first and second embodiments of the present invention will be explained in detail separately.

Embodiment 1

A single mode semiconductor laser has its wavelength undergoing mode lopping depending on the relation between the drive current and chip temperature. In this case, the amount of wavelength variation is not random, but exhibits a certain regularity. The wavelength λ of the semiconductor laser is expressed in terms of the resonator length L and the reflective index n of the semiconductor laser chip, as follows.

$$\lambda = 2nL/q \qquad (1)$$

where q is an integer representing the order of mode.

The resonator length L is incomparably longer than the oscillation wavelength λ, allowing the resonance of numerous slightly different wavelengths, and one of the wavelengths that provides the maximum gain is selected to cause the laser oscillation to occur. A variation of the temperature of the semiconductor laser causes the wavelength of maximum gain to vary, and the wavelength hops at the interval of the amount of wavelength variation Δλ resulting from the variation of mode order by one.

Accordingly, the oscillation wavelength at the occurrence of mode hopping takes discrete values. In a temperature variation range in which mode hopping does not occur but the effective resonator length 2nL varies depending on the temperature, the wavelength varies in proportion to the temperature variation.

The present invention is based on the fact that the amount of wavelength variation at mode hopping takes a certain value, and is intended to perform the position detection by synthesizing the wavelengths before and after mode hopping, which is made by varying the temperature.

This mode hopping, however, does not occur instantaneously, mode transition takes place from one λ mode to another following the state of concurrent oscillation in both modes. In order to dissolve this situation, the temperature of semiconductor laser is varied so that the period of indeterminate wavelength due to mode hopping becomes negligible relative to the effective measuring period.

When the injection current to the semiconductor laser is varied, with the case temperature being kept constant, the oscillation wavelength varies, and it is known that mode hopping also takes place at this time depending on the relation between the case temperature and injection current. Accordingly, controlling the injection current achieves the same effect as varying the temperature.

An embodiment in which the present invention is applied to the sampling scheme will be explained.

Figure 1:
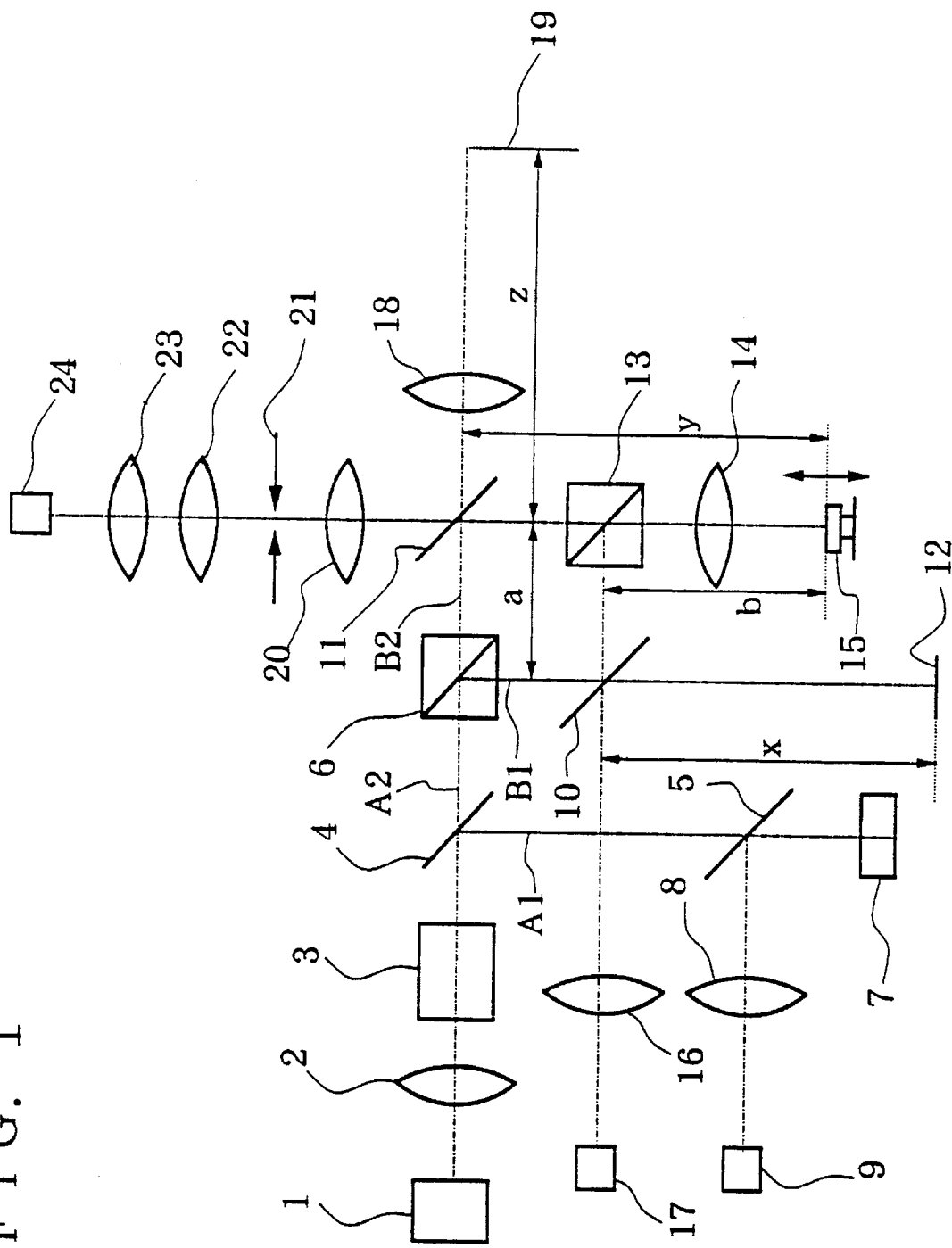
FIG. 1 is a diagram showing the optical system of the sampling scheme based on the first embodiment of this invention.

FIG. 1 shows the arrangement of the optical system. A light beam emitted by a semiconductor laser 1 is collimated by a collimator lens 2, and then it is incident to an isolator 3 which prevents the light source from being affected by the reflected light.

The light beam which has passed through the isolator 3 is split by a first beam splitter 4 into a light beam A1 which is directed to a second beam splitter 5 and a light beam A2 which is directed to a polarizing beam splitter 6.

The light beam A1 goes through the second beam splitter 5 and is incident to a plane-parallel plate 7. The reflected lights from the front and rear surfaces of the plane-parallel plate 7 are rendered the reflective composition by the second beam splitter 5 and converged on a first light sensor 9 by a convergent lens 8, and the resulting light beams interfere with each other.

The light beam A2 is split by the polarizing beam splitter 6 into a light beam B1 that is an s-polarized component directed to a third beam splitter 10 and a light beam B2 that is a p-polarized component directed to a fourth beam splitter 11.

The light beam B1 is split by the third beam splitter 10 into a light beam directed to a fixed mirror 12 and a light beam directed to a polarizing beam splitter 13. Since the light beam directed to the polarizing beam splitter 13 is an s-polarized component, it is reflected by the polarizing beam splitter 13 and then converged on a movable mirror 15 by a convergent lens 14. The light beam converged on the movable mirror 15 goes back on the same light path, and it is merged by the third beam splitter 10 with the reflected light beam from the fixed mirror 12. After being converged by a convergent lens 16, they interfere with each other on a second light sensor 17.

The light beam B2 is split by the fourth beam splitter 11 into a light beam directed to an objective lens 18 and a light beam directed to the polarizing beam splitter 13. Since the latter light beam is a p-polarized light, it goes through the polarizing beam splitter 13 and is converged by the convergent lens 14 on the movable mirror 15. Also in this case, the reflected light goes back on the same light path and goes through the fourth beam splitter 11, and it interferes with the reflected light beam coming from a measurement surface 19 and is converged by the objective lens 18. The interfering light beams go by way of a convergent lens 20, pin hole 21 and lens 22, and, after being converged by a convergent lens 23, interfere with each other on a third light sensor 24.

Figure 2:
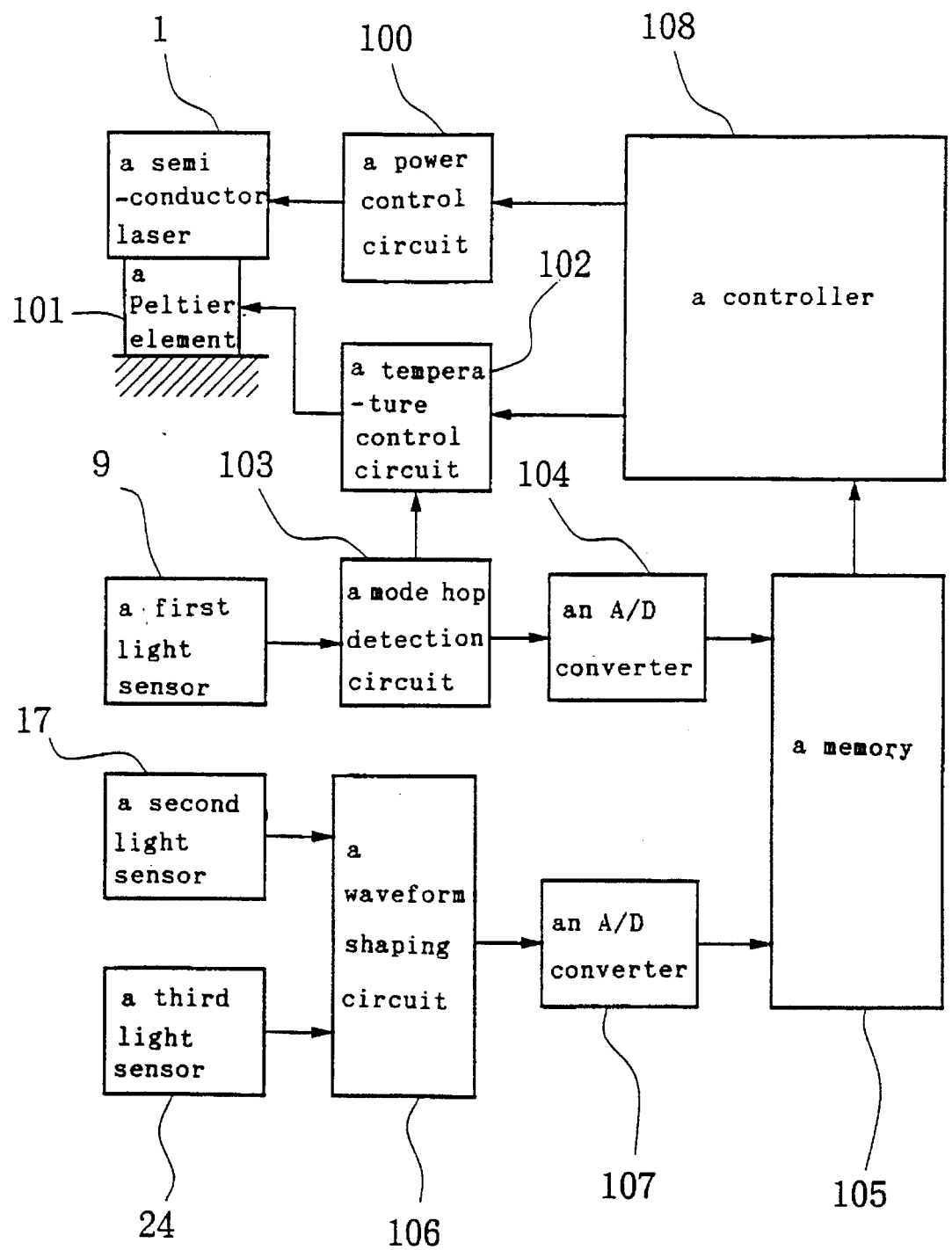
FIG. 2 is a block diagram of the control system for the optical system of FIG. 1.
Figure 4:
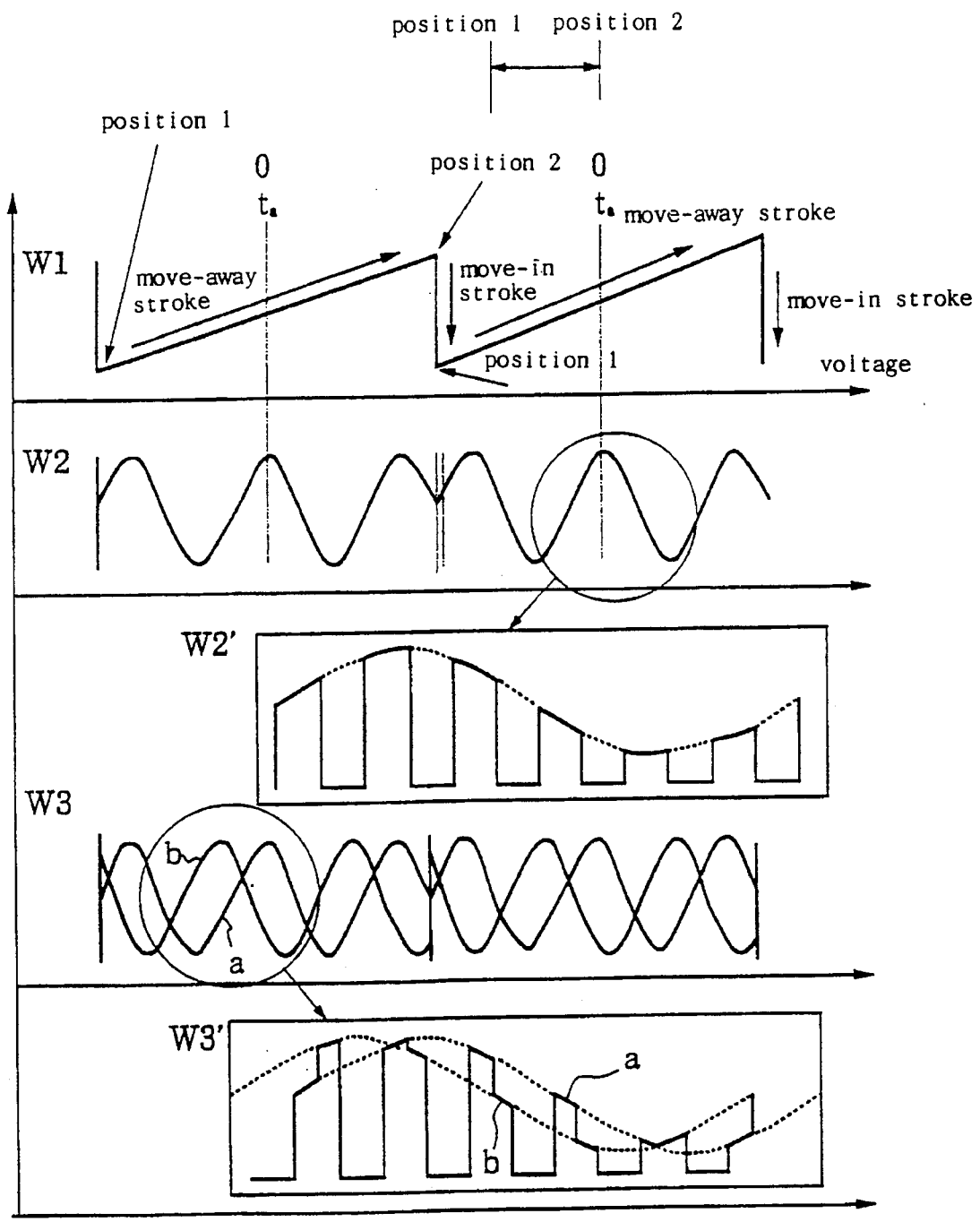
FIG. 4 is a diagram showing the relation between the movable mirror and the signal waveforms of the optical system of FIG. 1.
Figure 5:
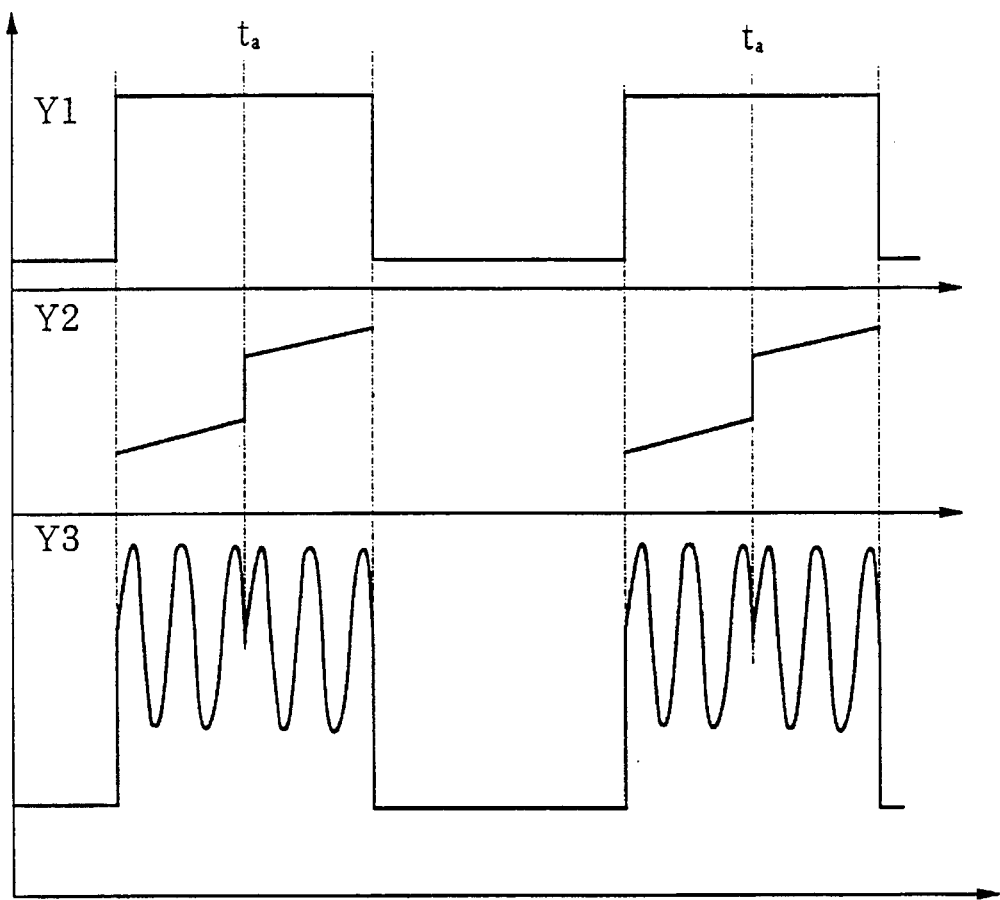
FIG. 5 is a diagram showing the relation between the mode hopping detection circuit and the signal waveforms of the optical system of FIG. 1.

The arrangement and the principle of measurement of the measuring system will now be explained. FIG. 2 is a block diagram of the control system, and FIG. 3, FIG. 4 and FIG. 5 show signal waveforms.

The light sourcing semiconductor laser 1 is driven pulsatively by a power control circuit 100, with its power being kept constant. During the control, the amount of light received by a monitoring diode which is incorporated in the semiconductor laser 1 is sampled and held, and it is fed back to the drive current so that the power throughout the light-up period is kept constant.

The semiconductor laser 1 is designed to be temperature-controlled by means of a Peltier element 101, and it undergoes temperature control by the temperature control circuit 102.

Figure 3:
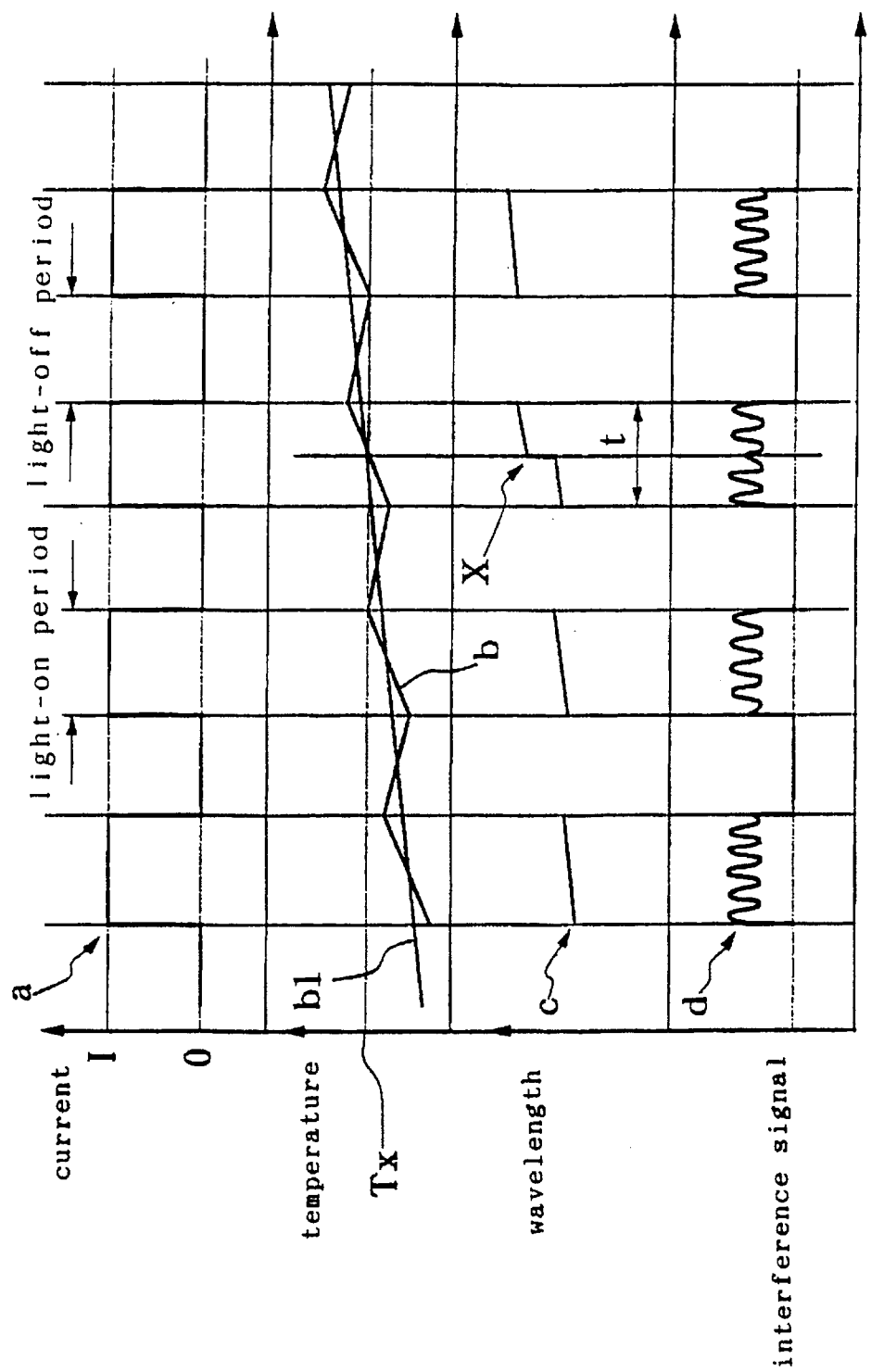
FIG. 3 is a diagram showing various signal waveforms observed during the pulsative drive of the optical system of FIG. 1.

The semiconductor laser 1 has its oscillation wavelength varied in response to the drive current and chip temperature, and the semiconductor laser 1, when driven pulsatively, varies its wavelength as shown by the waveform c of FIG. 3. This wavelength variation is attributable to the variation of chip temperature shown by the waveform b, which is caused by the on-off cycle of the drive current in pulsative driving as shown by the waveform a. When the case temperature of the semiconductor laser 1 is raised linearly as shown by the waveform b1, the oscillation wavelength varies. At a certain temperature, the semiconductor laser 1 behaves mode hopping, resulting in the emergence of a nonlinear portion X in the wavelength variation. This portion X is used.

Observed on the first light sensor 9 is the interference signal (waveform d) of the light beams reflected on both sides of the plane-parallel plate 7. This signal is used by a mode hop detection circuit 103 to detect the temperature at mode hopping, and it is fed back to the temperature control circuit 102. This is done in such a manner of differentiating the signal of the waveform d and controlling the temperature so that the nonlinear portion X is always located at a certain position, e.g., center, of the light-up period t (i.e., controlling the temperature to be Tx).

The mode hop detection circuit 103 has a function of a detector for detecting the amount of variation of the oscillation wavelength at mode hopping by detecting the amount of phase variation on the waveform d at the portion X.

The waveform signal d is stored in a memory 105 by way of an A/D converter 104. This is based on the fact that the amount of variation of the oscillation wavelength can be calculated from the phase variation of the waveform d.

Received by the second light sensor 17 is the interfering reflected light beams from the fixed mirror 12 and movable mirror 15. The movable mirror 15 is adapted to move within a certain range in the direction of optical axis by being held with a piezo-electric element, for example.

The third beam splitter 10 and fixed mirror 12 have an optical distance x that is set equal to the optical distance s (s=a+b) from the third beam splitter 10 to the movable mirror 15.

The relation of the movable mirror 15 to the waveforms will be explained with reference to FIG. 4.

Signal W1 is the waveform of a voltage applied to the piezo-electric element (not shown) which moves the movable mirror 15. A slope section of about 30° (forward stroke) represents the move-away stroke in the depth direction, while a vertical fall section following the slope (return stroke) represents the quick move-in stroke in the depth direction.

By moving the movable mirror 15 back and forth cyclically in a saw-tooth fashion as shown by the waveform W1 of FIG. 4, an interference signal as shown by the waveform W2 is produced. The interfering signal has its phase $\phi$ expressed as a function of the oscillation wavelength $\lambda$ as follows.

$$\phi = 2\pi \times 2(x-s)/\lambda \quad (2)$$

Namely, in response to the variation in the difference of light path lengths x and s due to the movement of the movable mirror 15, the interfering light beams are rendered the mutual reinforcement when the 2(x-s) term is a multiple of the wavelength $\lambda$ or the mutual reduction when it is an odd multiple of the half wavelength $\lambda/2$, resulting in a sinusoidal signal. The light beams certainly have the mutual reinforcement at time $t_o$ of the waveform W2 when x is equal to s, forming the peak of the sinusoidal wave irrespective of the light wavelength. The brightness varies cyclically as the value of 2(x-s) increases.

Here, an assumption is made that the semiconductor laser 1 is driven pulsatively, with mode hopping occurring at the middle of the light-up period. By setting the pulse drive frequency $f_p$ sufficiently high relative to the sinusoidal signal frequency $f_L$ resulting from the movement of the movable mirror 15, the received light beam is observed as a continuous sinusoidal waveform.

There arise two different wavelengths for the former half section and latter half section of a light-up period. With the former and latter half sections of a light-up period having wavelengths $\lambda1$ and $\lambda2$, respectively, there will emerge a waveform for the wavelength $\lambda1$ in the former half section and a waveform for the wavelength $\lambda2$ in the latter half section of the light-up period.

These waveforms, however, are completely in-phase at the movement center position $t_o$ of the movable mirror 15 where the difference of light path lengths 2(x-s) is zero, and become out of phase by the amount of the difference of wavelengths as their distances deviate. The difference of the wavelengths $\lambda1$ and $\lambda2$ is equal to the amount of wavelength variation caused by mode hopping, which is sufficiently smaller than the wavelength $\lambda1$ and is generally around 1 nm for the 780 nm semiconductor laser.

On this account, the signal waveform W2 produced by the second light sensor 17 appears to be a coincident sinusoidal wave having virtually the same phase and same period for the former and latter half sections of a light-up period as shown by the enlarged waveform W2', and it is observed as if there is a single waveform.

The third light sensor 24 produces a signal resulting from the interference of the reflected light from the movable mirror 15 and the reflected light from the measurement surface 19. Also in this case, a sinusoidal signal similar to that of the second light sensor 17 is produced. The optical distance z from the fourth beam splitter 11 to the measurement surface 19 is unknown, and it is the distance to be measured.

When the distance z is equal to the optical distance y from the fourth beam splitter 11 to the movable mirror 15, the third light sensor 24 produces a signal having the same waveform as W2' of the second light sensor 17, or it produces a waveform W3 when z is not equal to y.

The reason is that the waveform W3 consists of part a for the wavelength $\lambda1$ of the former half section and part b for the wavelength $\lambda2$ of the latter half section of a light-up period, with these parts a and b being expressed in a manner of time division as shown by the time-expanded waveform W3' for the encircled portion of W3.

The part a of the waveform W3 results from the interference of light beams with the wavelength $\lambda1$ at around the difference of light path lengths 2(z-y), while the part b results from the interference of light beams with the wavelength $\lambda2$ at around the difference of light path lengths 2(z-y).

The interfering signals have their phases expressed as follows.

$$\phi1 = 2\pi \times 2(z-y)/\lambda1 \quad (3)$$

$$\phi2 = 2\pi \times 2(z-y)/\lambda2 \quad (4)$$

Subtracting the equation (4) from (3) results as follows.

$$\phi1 - \phi2 = K(1/\lambda1 - 1/\lambda2) \quad (5)$$
$$= K/\Lambda$$

where $K=2\pi \times 2(z-y)$ and $\Lambda = 1 \times \lambda2/|\lambda2-\lambda1|$.

Namely, the phase difference of the two interfering signals is a function of the synthetic wavelength $\Lambda$ and the difference of light path lengths 2(z-y).

Accordingly, when the synthetic wavelength $\Lambda$ is known, the difference of light path length 2(z-y) can be evaluated by measuring the phase difference between the parts a and b of the waveform W3.

Generally, the position of the movable mirror 15 moved by the piezo-electric element is likely to fluctuate. Thus it is desirable to measure the position of the movable mirror 15 with respect to the fixed mirror 12 based on the signal waveform provided by the second light sensor 17 and measure the position of the measurement surface 19 with respect to the movable mirror 15 based on the signal waveform provided by the third light sensor 24, separately but simultaneously, and calculate the difference of the measured positions thereby to determine the distance to the measurement surface 19 accurately.

Based on the foregoing principle, the signals provided by the second light sensor 17 and third light sensor 24 are fed to a waveform shaping circuit 106, by which the former half section and latter half section of a light-up period are sampled, and the waveforms of the wavelengths λ1 and λ2 are processed separately by an A/D converter 107. Data of both wavelengths are stored in the memory 105, rendered the waveform analysis by a controller 108, the phase difference of the signals is calculated, and the absolute distance to the measurement surface is determined.

As described above, the mode hop detection circuit 103 functions as a detector of the amount of variation of the oscillation wavelength at mode hopping, besides the detection of the temperature at mode hopping, and it works as a means of evaluating the synthetic wavelength. This operation will further be explained with reference to FIG. 5. The semiconductor laser 1 is driven pulsatively as shown by the waveform Y1, causing its temperature to vary. Assuming that the temperature of the semiconductor laser 1 is varied linearly, with mode hopping taking place at the middle of the light-up period, the wavelength variation is as shown by the waveform Y2.

The light intensity I of the interference signal is expressed in terms of the amount of wavelength variation Δλ resulting from the temperature variation of the semiconductor laser 1, the optical length L of the plane-parallel plate 7, the intensity $I_1$ of reflected light on the surface of the plane-parallel plate 7, and the intensity $I_2$ of reflected light on the rear surface as follows.

$$I=I_1+I_2+2\times(I_1\times I_2)^{1/2}\times\cos\delta \quad (6)$$

where $\delta=4\pi\times L\times(1/\lambda_o-\Delta\lambda/\lambda_o^2)$.

Namely, the phase δ of the interference signal is proportional to the optical length L of the plane-parallel plate 7, and it varies in a sinusoidal fashion in response to the amount of wavelength variation Δλ of the oscillation wavelength. If the semiconductor laser 1 undergoes mode hopping at time $t_a$ during the variation of temperature, the oscillation wavelength varies suddenly, creating the discontinuity of phase of the waveform Y3 at time $t_a$.

Assuming that the semiconductor laser 1 varies its oscillation wavelength from λ1 to λ2, the phases φ1 and φ2 before and after the time point $t_a$ are expressed as follows.

$$\phi 1=2\pi\times 2L/\lambda 1 \quad (7)$$

$$\phi 2=2\pi\times 2L/\lambda 2 \quad (8)$$

Subtracting the equation (8) from (7) results as follows.

$$\phi 1-\phi 2=2\pi\times 2L/\delta \quad (9)$$

Since the optical length L of the plane-parallel plate 7 is known, the synthetic wavelength δ can be determined by evaluating the phase difference before and after the time point $t_a$.

Based on the foregoing principle, the amount of wavelength variation caused by mode hopping of the semiconductor laser 1 can be obtained in terms of the synthetic wavelength.

Although the linear temperature variation of the semiconductor laser 1 has been assumed, it is not linear actually due to the pulsative driving. However, since it is sufficient to measure the phase difference at time points of data sampling before and after $t_a$, the interference signal provided by the first light sensor 9 is introduced to calculate the phase difference of the signal at the data sampling time points, thereby eliminating the influence of nonlinearity of the wavelength variation of the semiconductor laser 1.

If the wavelengths of the semiconductor laser before and after mode hopping are known, the synthetic wavelength A can be known from these values and the interferometer formed by the plane-parallel plate 7 is not required.

Embodiment 2

The continuous data sampling scheme will be explained as the second embodiment of this invention.

Figure 6:
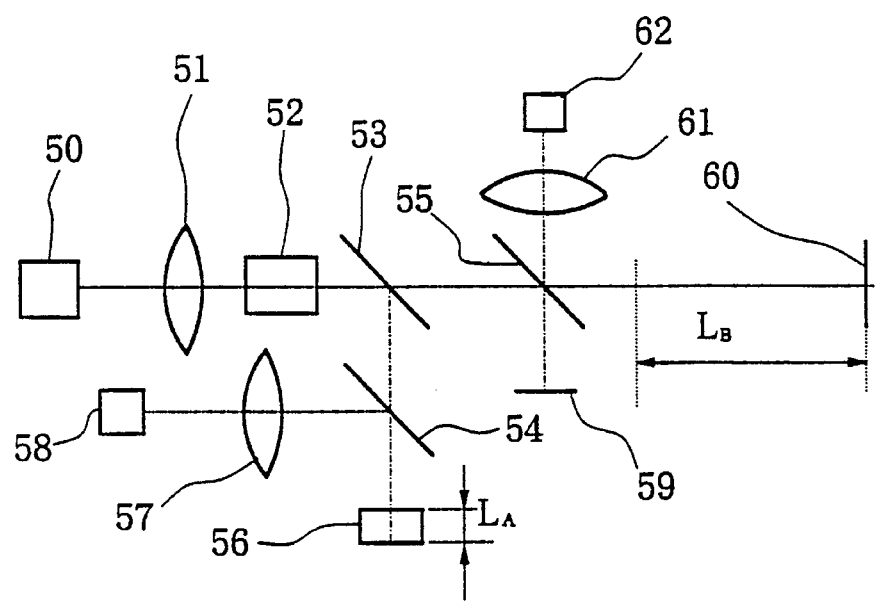
FIG. 6 is a diagram showing the optical system of the continuous data sampling scheme based on the second embodiment of this invention.

FIG. 6 shows the arrangement of the optical system. A light beam emitted by a semiconductor laser 50 is collimated by a collimator lens 51, and then it is incident to an isolator 52 which prevents the light source from being affected by the reflected light.

The light beam which has passed through the isolator 52 is split by a first beam splitter 53 into a light beam A which is directed to a second beam splitter 54 and a light beam B which is directed to a third beam splitter 55. The light beam A goes through the second beam splitter 54 and is directed to a plane-parallel plate 56. The light beams reflected on the front and rear surfaces of the plane-parallel plate 56 are rendered the reflective composition by the second beam splitter 54 and converged by a convergent lens 57 on a first light sensor 58, where the resulting light beams interfere with each other.

The light beam B is split by the third beam splitter 55 into a light beam which is directed to a reference mirror 59 and a light beam which is directed to a measurement surface 60. The light beams reflected by the reference mirror 59 and measurement surface 60 are merged by the third beam splitter 55 and converged by a convergent lens 61 on a second light sensor 62, where the resulting light beams interfere with each other.

Next, the principle of measurement and the method of signal processing will be explained.

Figure 7:
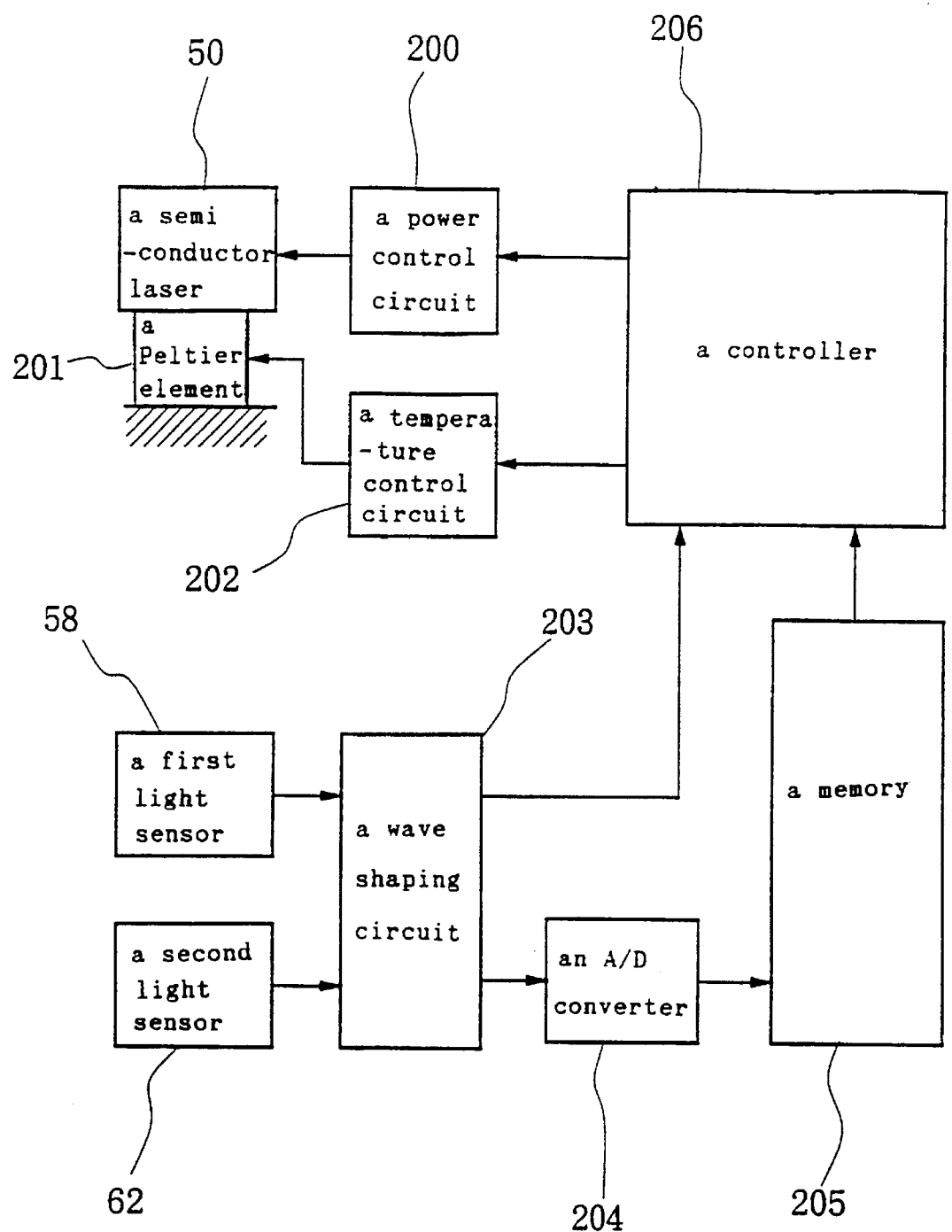
FIG. 7 is a block diagram of the processing system for the optical system of FIG. 6.
Figure 8:
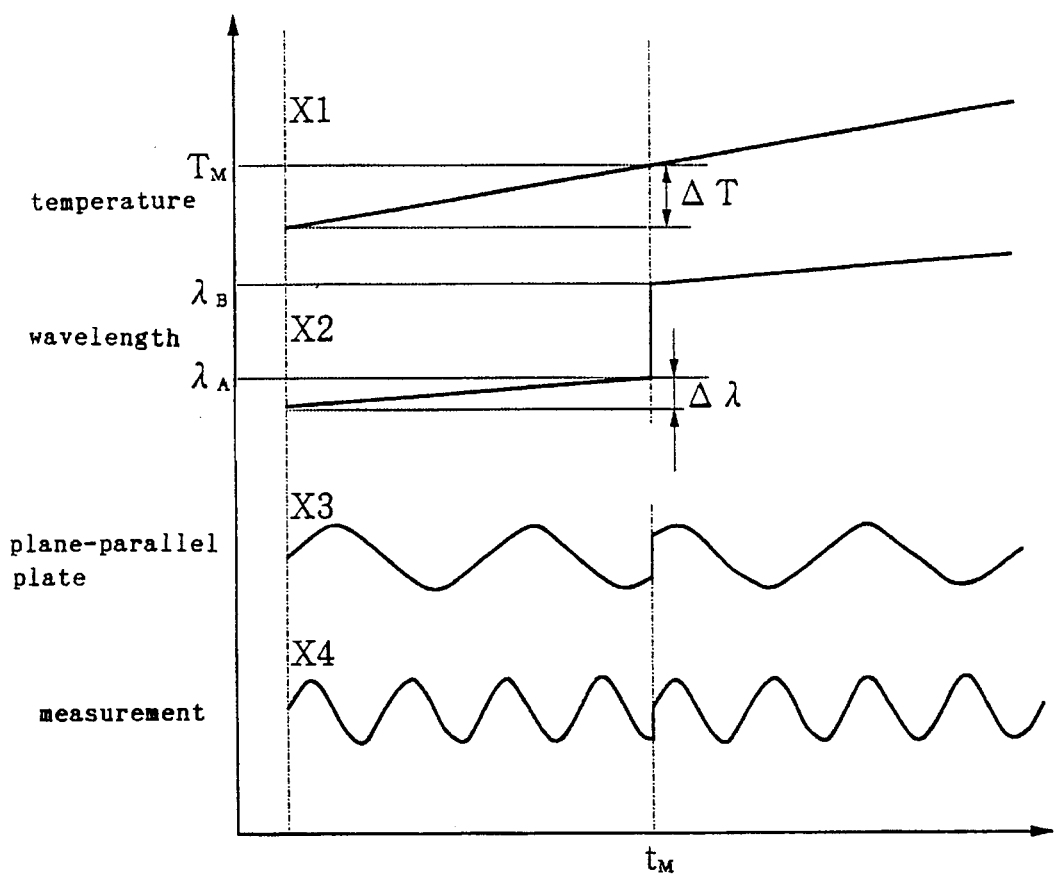
FIG. 8 is a diagram showing the waveforms of process of the optical system of FIG. 6.

FIG. 7 is a block diagram of the processing system, and FIG. 8 shows the waveforms observed during the process.

The semiconductor laser 50 is controlled independently for its light output and temperature, as in the first embodiment. Although the second embodiment is designed to vary the temperature while maintaining the light output constant, the drive current may be varied while maintaining the temperature constant to achieve the same effect.

A power control circuit 200 operates on a photodiode incorporated in the semiconductor laser 50 to monitor the light output so that it is kept constant. A temperature control circuit 202 operates to control the temperature of the semiconductor laser 50 to an arbitrary level by means of a Peltier element 201.

The first light sensor 58 produces a signal resulting from the interference of the reflected light beams from the front and rear surfaces of the plane-parallel plate 56, and it is attributable to a light path difference $L_A$ of the plane-parallel plate 56 as an internal interferometer.

The second light sensor 62 produces a signal resulting from the interference of the reflected light beams from the reference mirror 59 in the apparatus and the measurement surface 60, and it is attributable to a light path difference $L_B$ of the measuring interferometer system.

When the temperature of the semiconductor laser 50 is varied linearly as shown by the waveform X1 of FIG. 8, the oscillation wavelength λ of the semiconductor laser 50 varies as shown by the waveform X2. During a period when mode hopping does not occur, the amount of wavelength variation Δλ and the amount of temperature variation ΔT have their relation expressed as follows.

$$\Delta\lambda = p \times \Delta T \tag{10}$$

where p is a constant specific to the semiconductor laser 50.

When mode hopping takes place at temperature $T_M$, the oscillation wavelength behaves a nonlinear variation as shown at the point $t_M$ of the waveform X2.

Consequently, the first light sensor 58 produces a waveform X3 of FIG. 8 and the second light sensor 62 produces a waveform X4, as has been explained previously in regard to the detection of the amount of wavelength variation in the first embodiment, as a result of the variation of the oscillation wavelength of the semiconductor laser 50 as shown by the waveform X2.

The phase difference δ between the phase δ1 of the interference signal at the commencement of detection (wavelength λ1) before the occurrence of mode hopping and the phase δ2 of the signal at the end of detection (wavelength λ1+Δλ) is expressed in terms of the wavelength λ1, the amount of wavelength variation Δλ and the difference of light path length L' as follows.

$$\begin{aligned} \delta 1 &= 4\pi L' \times (1/\lambda 1) \\ \delta 2 &= 4\pi L' \times \{1/(\lambda 1 + \Delta\lambda)\} \\ &= 4\pi L' \times (1/\lambda 1 - \Delta\lambda/\lambda 1^2) \\ |\delta| &= |\delta 1 - \delta 2| \\ &= 4\pi L' \times (\Delta\lambda/\lambda 1^2) \end{aligned} \tag{11}$$

Namely, the phase difference δ of the interference signal is a function of the amount of wavelength variation Δλ and the difference of light path length L'.

Since the waveforms X3 and X4 are derived from the same light, they have the same amount of wavelength variation. Consequently, the interfering signals have a period T expressed as follows.

$$\begin{aligned} T &= 2\pi/\delta \\ &= 1/(2 \times k \times L') \end{aligned} \tag{12}$$

where $k = \Delta\lambda/\lambda 1^2$.

The waveforms X3 and X4 have their periods $T_3$ and $T_4$, respectively, expressed in terms of the optical length $L_A$ of the plane-parallel plate 56 and the difference of optical path lengths $L_B$ of the measuring interferometer as follows.

$$T_3 = 1/(2 \times k \times L_A) \tag{13}$$

$$T_4 = 1/(2 \times k \times L_B) \tag{14}$$

The ratio of these periods is inversely proportional to the ratio of the light path lengths as follows.

$$T_3/T_4 = L_B/L_A \tag{15}$$

Accordingly, with the optical length $L_A$ of the plane-parallel plate 56 being known, the light path length $L_B$ of the measuring interferometer can be evaluated from the ratio of the periods $T_3$ and $T_4$ of the interfering signals.

However, it is difficult to detect the periods of interference signal accurately, and it is not suitable for the enhancement of measuring accuracy. Therefore, this principle is applied to the coarse measurement, while implementing the fine measurement based on the wavelength variation caused by mode hopping, thereby attaining the higher accuracy of measurement.

This affair will further be explained.

At the occurrence of mode hopping at time $t_M$, there arises a discontinuous portion in the phase of interference signal.

For the wavelengths $\lambda_A$ and $\lambda_B$ before and after mode hopping, their phases $\phi_A$ and $\phi_B$ are expressed as follows.

$$\phi_A = 2\pi \times 2 \times L'/\lambda_A \tag{16}$$

$$\phi_B = 2\pi \times 2 \times L'/\lambda_B \tag{17}$$

The phase difference $\phi_A - \phi_B$ is as follows.

$$\phi_A - \phi_B = 2\pi \times 2 \times L' \times (1/\lambda_A 11/\lambda_B) = 2\pi \times 2 \times L'/\Lambda_M \tag{18}$$

where $\Lambda_M$ is the synthetic wavelength calculated from $\lambda_A$ and $\lambda_B$.

Accordingly, by detecting the phase difference on the waveform X3 and knowing the optical length $L_A$ of the plane-parallel plate 56, the synthetic wavelength $\Lambda_M$ can be calculated, and the light path length $L_B$ of the measuring interferometer can be calculated from the phase difference of the waveform X4.

Based on the foregoing principle, the signals from the first light sensor 58 and second light sensor 62 are shaped by a wave shaping circuit 203 and stored in a memory 205 by way of an A/D converter 204. The wave shaping circuit 203 has a function of detecting a mode hopping. The system implements the A/D conversion for the interference signals provided by the light sensors 58 and 62, while varying the temperature of the semiconductor laser 50, and stores the waveform data continuously in the memory 204 until a certain time point after the wave shaping circuit 203 has detected a mode hopping.

The controller 205 analyzes the waveform data stored in the memory 204 to detect the phases of the interference signal before and after mode hopping. The distance to the measurement surface 60 is determined from the difference of the phases.

Even if the waveform includes an unsettled period during mode hopping, the phase can be calculated mathematically; and therefore, it does not seriously affect the measurement.

We claim:

1. A position detecting apparatus comprising:

a light emitter which activates a laser source to emit a light beam so that mode hopping occurs;

an interference optical system which directs the light beam from said laser source to a measuring light path on which an object to be measured is located and a reference light path on which a reflection mirror is placed, and merges reflected light beams coming back on said light paths so that the reflected light beams interfere with each other;

a light sensor which receives the interference light beam provided by said interference optical system; and a position detector which determines the position of said object of measurement based on the interference signals produced by said light sensor before and after mode hopping caused by said light emitter.

2. A position detecting apparatus according to claim 1 further including a light path length varier which varies the light path length to said object of measurement or the light path length to said reflection mirror placed on said reference light path by at least the value of wavelength of said laser source around mode hopping, wherein said position detector samples interference signals before and after mode hopping caused by said light emitter during the period when said light path length varier is varying the light path length, and determines the position of said object of measurement based on the phase difference of the two sampled signals.

3. A position detecting apparatus according to claim 2, wherein said lights, emitter is designed to activate said laser source to emit a light beam pulsatively by injecting a current of a rectangular waveform to said laser source, said pulsative light emission having a frequency ($f_p$) set higher than a frequency ($f_L$) of light path length variation by said light path length varier.

4. A position detecting apparatus according to claim 1 further including wavelength varying means for varying the wavelength of the light beam emitted by said laser source during prescribed periods before and after mode hopping.

5. A position detecting apparatus according to claim 4, wherein said wavelength varying means comprises a temperature varier which varies the temperature of said laser source or an injection current varier which varies the injection current to said laser source.

6. A position detecting apparatus according to claim 1, 2 or 4, wherein said light emitter comprises:

a mode hop detector which detects as to whether or not mode hopping has occurred during the activation of said laser source;

a temperature detector which detects the temperature (mode hop temperature) of said laser source at the detection of mode hopping by said mode hop detector and;

a temperature controller which controls the temperature of said laser source so that the laser source temperature includes the mode hop temperature detected by said temperature detector during pulsative driving.

7. A position detecting apparatus according to claim 1 or 4, wherein said position detector comprises:

a phase difference detector which evaluates the phase difference of the interference signals provided by said light emitter before and after mode hopping; and a position calculator which determines the position of said object of measurement based on the evaluated phase difference and a synthetic wavelength ($\Lambda$) that is evaluated from the wavelengths ($\lambda 1$ and $\lambda 2$) of said laser source before and after mode hopping.

* * * * *